United States Patent
Rouse et al.

(10) Patent No.: US 11,146,656 B2
(45) Date of Patent: Oct. 12, 2021

(54) FEATURE ACTIVATION CONTROL AND DATA PREFETCHING WITH NETWORK-CONNECTED MOBILE DEVICES

(71) Applicant: Tealium Inc., San Diego, CA (US)

(72) Inventors: Craig P. Rouse, Didcot (GB); Harry Cassell, Didcot (GB); Christopher B. Slovak, Carlsbad, CA (US)

(73) Assignee: Tealium Inc., San Diego, CA (US)

( * ) Notice: Subject to any disclaimer, the term of this patent is extended or adjusted under 35 U.S.C. 154(b) by 0 days.

(21) Appl. No.: 17/127,858

(22) Filed: Dec. 18, 2020

(65) Prior Publication Data

US 2021/0194983 A1    Jun. 24, 2021

Related U.S. Application Data

(60) Provisional application No. 62/992,317, filed on Mar. 20, 2020, provisional application No. 62/952,007, filed on Dec. 20, 2019.

(51) Int. Cl.
| | | |
|---|---|---|
| *H04L 29/08* | (2006.01) | |
| *H04W 4/021* | (2018.01) | |
| *G06F 1/26* | (2006.01) | |
| *H04W 12/64* | (2021.01) | |

(52) U.S. Cl.
CPC ............ *H04L 67/2847* (2013.01); *G06F 1/26* (2013.01); *H04L 67/32* (2013.01); *H04L 67/327* (2013.01); *H04W 4/021* (2013.01); *H04W 12/64* (2021.01)

(58) Field of Classification Search
None
See application file for complete search history.

(56) References Cited

U.S. PATENT DOCUMENTS

| | | | |
|---|---|---|---|
| 6,058,482 | A | 5/2000 | Liu |
| 6,067,565 | A | 5/2000 | Horvitz |
| 6,098,064 | A | 8/2000 | Pirolli |
| 6,141,010 | A | 10/2000 | Hoyle |
| 6,189,016 | B1 | 2/2001 | Cabrera |
| 6,341,353 | B1 | 1/2002 | Herman et al. |
| 6,553,393 | B1 | 4/2003 | Eilbott et al. |

(Continued)

*Primary Examiner* — Backhean Tiv
(74) *Attorney, Agent, or Firm* — Knobbe, Martens, Olson & Bear, LLP

(57) ABSTRACT

In some embodiments, an electronic device is disclosed for intelligently prefetching data via a computer network. The electronic device can include a device housing, a user interface, a memory device, and a hardware processor. The hardware processor can: communicate via a communication network; determine that the hardware processor is expected to be unable to communicate via the communication network; responsive to determining that the hardware processor is expected to be unable to communicate via the communication network, determine prefetch data to request prior to the hardware processor being unable to communicate via the communication network; request the prefetch data; receive and store the prefetch data prior to the hardware processor being unable to communicate via the communication network; and subsequent to the hardware processor being unable to communicate via the communication network, process the prefetch data with an application responsive to processing a first user input with the application.

19 Claims, 5 Drawing Sheets

(56) References Cited

U.S. PATENT DOCUMENTS

| | | | | |
|---|---|---|---|---|
| 6,553,461 B1* | | 4/2003 | Gupta | G06F 16/9574 711/137 |
| 6,643,657 B1 | | 11/2003 | Baird et al. | |
| 6,681,370 B2 | | 1/2004 | Gounares et al. | |
| 6,771,290 B1 | | 8/2004 | Hoyle | |
| 6,836,799 B1 | | 12/2004 | Philyaw et al. | |
| 6,959,318 B1 | | 10/2005 | Tso | |
| 7,047,277 B1 | | 5/2006 | Welter et al. | |
| 7,047,485 B1* | | 5/2006 | Klein | G06F 16/9574 715/205 |
| 7,117,429 B2 | | 10/2006 | Vedullapalli | |
| 7,136,931 B2 | | 11/2006 | Natarajan | |
| 7,257,689 B1 | | 8/2007 | Baird | |
| 7,383,231 B2 | | 6/2008 | Gupta et al. | |
| 7,502,760 B1 | | 3/2009 | Gupta | |
| 7,599,856 B2 | | 10/2009 | Agrawal et al. | |
| 7,644,042 B2 | | 1/2010 | Ramavarjula | |
| 7,669,183 B2 | | 2/2010 | Bowman | |
| 7,685,168 B2 | | 3/2010 | Koinuma et al. | |
| 7,685,200 B2 | | 3/2010 | Gunawardena et al. | |
| 7,788,233 B1 | | 8/2010 | Iyer | |
| 7,805,670 B2 | | 9/2010 | Lipton et al. | |
| 7,823,059 B2 | | 10/2010 | Hodgkinson | |
| 7,831,562 B1 | | 11/2010 | DeVos | |
| 7,890,461 B2 | | 2/2011 | Oeda et al. | |
| 7,908,336 B2 | | 3/2011 | Carlson et al. | |
| 7,925,771 B1* | | 4/2011 | Ping | H04L 65/4092 709/231 |
| 7,992,135 B1 | | 8/2011 | Wong et al. | |
| 8,010,890 B2 | | 8/2011 | Gumz et al. | |
| 8,019,777 B2 | | 9/2011 | Hauser | |
| 8,131,861 B2 | | 3/2012 | Butler et al. | |
| 8,166,474 B1 | | 4/2012 | Delco et al. | |
| 8,185,610 B2 | | 5/2012 | Goff | |
| 8,250,196 B2 | | 8/2012 | Demir et al. | |
| 8,316,188 B2 | | 11/2012 | Kadambi et al. | |
| 8,375,319 B2 | | 2/2013 | Decker et al. | |
| 8,407,321 B2 | | 3/2013 | Mickens et al. | |
| 8,413,046 B1 | | 4/2013 | Mocanu | |
| 8,429,243 B1 | | 4/2013 | Wang et al. | |
| 8,443,036 B2 | | 5/2013 | Li et al. | |
| 8,515,931 B1 | | 8/2013 | Amacker | |
| 8,533,305 B1 | | 9/2013 | Keagy et al. | |
| 8,539,345 B2 | | 9/2013 | Appleyard et al. | |
| 8,560,610 B2 | | 10/2013 | Lunt et al. | |
| 8,566,696 B1 | | 10/2013 | Hamon | |
| 8,682,964 B1 | | 3/2014 | Brundage | |
| 8,744,988 B1 | | 6/2014 | Hamon | |
| 8,745,341 B2* | | 6/2014 | Turk | G06F 16/9574 711/162 |
| 8,769,073 B2* | | 7/2014 | Humphreys | G06F 16/9574 709/223 |
| 8,805,946 B1 | | 8/2014 | Glommen et al. | |
| 8,806,482 B1 | | 8/2014 | Nagargadde et al. | |
| 8,843,827 B2 | | 9/2014 | Koo et al. | |
| 8,904,278 B1 | | 12/2014 | Anderson et al. | |
| 8,984,048 B1 | | 3/2015 | Maniscalo | |
| 8,990,298 B1 | | 3/2015 | Anderson | |
| 9,021,352 B2 | | 4/2015 | Goel et al. | |
| 9,058,324 B2* | | 6/2015 | Kohlenberg | G06F 11/008 |
| 9,081,789 B2 | | 7/2015 | Anderson | |
| 9,116,608 B2 | | 8/2015 | Koo et al. | |
| 9,165,308 B2 | | 10/2015 | Cook | |
| 9,288,256 B2 | | 3/2016 | Goodwin | |
| 9,313,287 B2 | | 4/2016 | Glommen et al. | |
| 9,357,023 B2 | | 5/2016 | Glommen et al. | |
| 9,363,311 B1 | | 6/2016 | McWilliams et al. | |
| 9,412,115 B2 | | 8/2016 | Seolas et al. | |
| 9,418,170 B2 | | 8/2016 | Seolas et al. | |
| 9,479,609 B2 | | 10/2016 | Anderson | |
| 9,503,499 B1 | | 11/2016 | Donaldson | |
| 9,537,964 B2 | | 1/2017 | Glommen et al. | |
| 9,690,868 B2 | | 6/2017 | Anderson | |
| 9,753,898 B1 | | 9/2017 | Glommen et al. | |
| 9,785,664 B2 | | 10/2017 | Qian et al. | |
| 9,807,184 B1 | | 10/2017 | Slovak et al. | |
| 9,998,926 B1* | | 6/2018 | Gale | H04L 41/147 |
| 10,009,439 B1* | | 6/2018 | Kolam | H04L 67/2852 |
| 10,051,426 B2* | | 8/2018 | Castelli | H04L 67/2847 |
| 10,078,708 B2 | | 9/2018 | Slovak | |
| 10,117,058 B2* | | 10/2018 | Begeja | H04L 65/4076 |
| 10,129,362 B2* | | 11/2018 | Toksoz | H04L 67/02 |
| 10,268,657 B2 | | 4/2019 | Kirk et al. | |
| 10,327,018 B2 | | 6/2019 | Anderson et al. | |
| 10,397,734 B2* | | 8/2019 | Anderson | H04W 4/025 |
| 10,560,546 B2* | | 2/2020 | Zhang | H04L 67/04 |
| 10,568,009 B2* | | 2/2020 | Sleight | H04L 65/80 |
| 10,587,716 B2* | | 3/2020 | Don | H04N 21/44209 |
| 10,592,578 B1* | | 3/2020 | Mokashi | H04L 67/2847 |
| 2001/0042171 A1 | | 11/2001 | Vermeulen | |
| 2002/0010679 A1 | | 1/2002 | Felsher | |
| 2002/0027567 A1 | | 3/2002 | Niamir | |
| 2002/0059325 A1 | | 5/2002 | Beizer et al. | |
| 2002/0073043 A1 | | 6/2002 | Herman et al. | |
| 2002/0078147 A1 | | 6/2002 | Bouthors et al. | |
| 2002/0083167 A1 | | 6/2002 | Costigan et al. | |
| 2002/0116318 A1 | | 8/2002 | Thomas et al. | |
| 2002/0129166 A1 | | 9/2002 | Baxter et al. | |
| 2002/0161757 A1 | | 10/2002 | Mock et al. | |
| 2003/0001888 A1 | | 1/2003 | Power | |
| 2003/0125924 A1 | | 7/2003 | Lines | |
| 2003/0126200 A1 | | 7/2003 | Wolff | |
| 2003/0173402 A1 | | 9/2003 | Ogawa | |
| 2003/0184452 A1 | | 10/2003 | Goodgoll | |
| 2003/0217040 A1 | | 11/2003 | Osborne | |
| 2003/0229529 A1 | | 12/2003 | Mui | |
| 2004/0003130 A1 | | 1/2004 | Becker | |
| 2004/0034752 A1 | | 2/2004 | Ohran | |
| 2004/0039962 A1 | | 2/2004 | Ganesh | |
| 2004/0054784 A1 | | 3/2004 | Busch et al. | |
| 2004/0083259 A1 | | 4/2004 | Tenembaum | |
| 2004/0123044 A1 | | 6/2004 | Franaszek | |
| 2004/0165581 A1 | | 8/2004 | Oogushi | |
| 2004/0240455 A1 | | 12/2004 | Shen | |
| 2004/0243767 A1 | | 12/2004 | Cierniak et al. | |
| 2004/0243939 A1 | | 12/2004 | Perepa | |
| 2005/0055426 A1* | | 3/2005 | Smith | H04L 67/2847 709/219 |
| 2005/0063395 A1 | | 3/2005 | Smith | |
| 2005/0071754 A1 | | 3/2005 | Morgan et al. | |
| 2005/0125289 A1 | | 6/2005 | Beyda et al. | |
| 2005/0125290 A1 | | 6/2005 | Beyda et al. | |
| 2005/0138143 A1* | | 6/2005 | Thompson | G06F 16/9574 709/218 |
| 2005/0154781 A1 | | 7/2005 | Carlson et al. | |
| 2005/0165643 A1 | | 7/2005 | Wilson | |
| 2005/0234936 A1 | | 10/2005 | Castro et al. | |
| 2005/0240943 A1 | | 10/2005 | Smith et al. | |
| 2005/0255893 A1* | | 11/2005 | Jin | H04W 52/0277 455/572 |
| 2006/0010103 A1 | | 1/2006 | Malik | |
| 2006/0014523 A1 | | 1/2006 | Reilly | |
| 2006/0020501 A1 | | 1/2006 | Leicht | |
| 2006/0031778 A1 | | 2/2006 | Goodwin et al. | |
| 2006/0095481 A1 | | 5/2006 | Singh | |
| 2006/0161635 A1 | | 7/2006 | Lamkin et al. | |
| 2006/0195779 A1 | | 8/2006 | McElroy | |
| 2006/0218223 A1 | | 9/2006 | Uchida | |
| 2006/0235938 A1 | | 10/2006 | Pennell | |
| 2006/0259949 A1 | | 11/2006 | Schaefer | |
| 2006/0271669 A1 | | 11/2006 | Bouguenon et al. | |
| 2006/0277198 A1 | | 12/2006 | Error | |
| 2007/0038516 A1 | | 2/2007 | Apple | |
| 2007/0050696 A1 | | 3/2007 | Piersol | |
| 2007/0150948 A1 | | 6/2007 | De Spiegeleer | |
| 2007/0153808 A1 | | 7/2007 | Parker | |
| 2007/0186150 A1 | | 8/2007 | Rao | |
| 2007/0192329 A1 | | 8/2007 | Croft | |
| 2007/0203937 A1 | | 8/2007 | Prahlad | |
| 2007/0219708 A1* | | 9/2007 | Brasche | G08G 1/0962 701/457 |
| 2007/0250618 A1 | | 10/2007 | Hammond | |
| 2008/0046562 A1 | | 2/2008 | Butler | |

(56) References Cited

U.S. PATENT DOCUMENTS

| | | |
|---|---|---|
| 2008/0077561 A1 | 3/2008 | Yomtobian |
| 2008/0086777 A1 | 4/2008 | Sanchez |
| 2008/0155537 A1 | 6/2008 | Dinda et al. |
| 2008/0228578 A1 | 9/2008 | Mashinsky |
| 2008/0228772 A1* | 9/2008 | Plamondon ......... G06F 16/9574 |
| 2008/0228914 A1 | 9/2008 | Ofel et al. |
| 2008/0229020 A1 | 9/2008 | Plamondon |
| 2008/0229025 A1 | 9/2008 | Plamondon |
| 2008/0235132 A1 | 9/2008 | Banatre |
| 2008/0244051 A1 | 10/2008 | Morris |
| 2008/0263297 A1 | 10/2008 | Herbst et al. |
| 2009/0006308 A1* | 1/2009 | Fonsen ............... G06F 16/9574 |
| 2009/0006945 A1 | 1/2009 | Gumz et al. |
| 2009/0077173 A1 | 3/2009 | Lowery et al. |
| 2009/0112975 A1 | 4/2009 | Beckman et al. |
| 2009/0180138 A1 | 7/2009 | Fukuda |
| 2009/0228774 A1 | 9/2009 | Matheny |
| 2009/0248494 A1 | 10/2009 | Hueter et al. |
| 2009/0248695 A1 | 10/2009 | Ozzie et al. |
| 2009/0248896 A1 | 10/2009 | Cohn |
| 2009/0293001 A1 | 11/2009 | Lu et al. |
| 2010/0027420 A1 | 2/2010 | Smith |
| 2010/0066688 A1 | 3/2010 | Jeon |
| 2010/0088398 A1 | 4/2010 | Plamondon |
| 2010/0107162 A1 | 4/2010 | Edwards et al. |
| 2010/0179967 A1 | 7/2010 | Zhang et al. |
| 2010/0185693 A1 | 7/2010 | Murty et al. |
| 2010/0228850 A1 | 9/2010 | Fomitchev |
| 2010/0250907 A1 | 9/2010 | DeHaan |
| 2010/0251128 A1 | 9/2010 | Cordasco |
| 2010/0281008 A1 | 11/2010 | Braunwarth |
| 2010/0281112 A1 | 11/2010 | Plamondon |
| 2010/0281178 A1 | 11/2010 | Sullivan |
| 2010/0318976 A1 | 12/2010 | Everly et al. |
| 2011/0015981 A1 | 1/2011 | Subramanian |
| 2011/0040718 A1* | 2/2011 | Tendjoukian ....... H04L 67/2847 706/52 |
| 2011/0047262 A1 | 2/2011 | Martin et al. |
| 2011/0055202 A1* | 3/2011 | Heimendinger ...... G06F 16/245 707/721 |
| 2011/0055314 A1 | 3/2011 | Rosenstein et al. |
| 2011/0055683 A1 | 3/2011 | Jiang |
| 2011/0055710 A1 | 3/2011 | Kirkby et al. |
| 2011/0082858 A1 | 4/2011 | Yu et al. |
| 2011/0082902 A1 | 4/2011 | Rottler et al. |
| 2011/0088086 A1 | 4/2011 | Swink et al. |
| 2011/0093461 A1 | 4/2011 | Mui et al. |
| 2011/0112901 A1 | 5/2011 | Fried et al. |
| 2011/0119374 A1 | 5/2011 | Ruhl et al. |
| 2011/0153422 A1 | 6/2011 | Cousins |
| 2011/0153796 A1 | 6/2011 | Branson |
| 2011/0167391 A1 | 7/2011 | Momeyer et al. |
| 2011/0185016 A1 | 7/2011 | Kandasamy et al. |
| 2011/0208582 A1 | 8/2011 | Hoyle |
| 2011/0218860 A1 | 9/2011 | Barber |
| 2011/0219115 A1 | 9/2011 | Capel et al. |
| 2011/0246647 A1 | 10/2011 | Marquezan |
| 2011/0246879 A1 | 10/2011 | White et al. |
| 2011/0282739 A1 | 11/2011 | Mashinsky et al. |
| 2011/0296322 A1 | 12/2011 | Dhanjal et al. |
| 2011/0302306 A1 | 12/2011 | Hanson et al. |
| 2011/0307561 A1 | 12/2011 | Gao |
| 2011/0314092 A1 | 12/2011 | Lunt et al. |
| 2012/0005257 A1 | 1/2012 | Narayanana et al. |
| 2012/0016836 A1 | 1/2012 | Fender et al. |
| 2012/0054596 A1 | 3/2012 | Kroger et al. |
| 2012/0066289 A1 | 3/2012 | Bland |
| 2012/0096013 A1 | 4/2012 | Ciancutti et al. |
| 2012/0124131 A1 | 5/2012 | Muret et al. |
| 2012/0154292 A1 | 6/2012 | Zhao et al. |
| 2012/0169624 A1 | 7/2012 | Garn et al. |
| 2012/0209581 A1 | 8/2012 | Gao |
| 2012/0220308 A1* | 8/2012 | Ledlie ................. H04W 4/021 455/456.1 |
| 2012/0221411 A1 | 8/2012 | Graham, Jr. |
| 2013/0055104 A1 | 2/2013 | Everingham et al. |
| 2013/0073401 A1 | 3/2013 | Cook |
| 2013/0086484 A1 | 4/2013 | Antin et al. |
| 2013/0091025 A1 | 4/2013 | Farahat et al. |
| 2013/0110818 A1 | 5/2013 | O'brien-Strain |
| 2013/0122854 A1 | 5/2013 | Agarwal et al. |
| 2013/0122856 A1* | 5/2013 | Kalmbach ............ H04L 67/289 455/405 |
| 2013/0124332 A1 | 5/2013 | Doughty et al. |
| 2013/0173402 A1 | 7/2013 | Young |
| 2013/0173540 A1 | 7/2013 | Qian |
| 2013/0191208 A1 | 7/2013 | Chourey et al. |
| 2013/0218961 A1* | 8/2013 | Ho ...................... H04L 12/1822 709/204 |
| 2013/0254897 A1 | 9/2013 | Reedy et al. |
| 2013/0282844 A1* | 10/2013 | Logan .................. H04L 67/146 709/206 |
| 2013/0282898 A1 | 10/2013 | Kalus et al. |
| 2013/0290480 A1 | 10/2013 | Manion et al. |
| 2013/0332604 A1 | 12/2013 | Seth et al. |
| 2013/0339650 A1 | 12/2013 | Alexander et al. |
| 2014/0013203 A1 | 1/2014 | Rogoveanu |
| 2014/0081981 A1 | 3/2014 | Morris |
| 2014/0089243 A1 | 3/2014 | Oppenheimer |
| 2014/0089330 A1 | 3/2014 | Cui et al. |
| 2014/0095943 A1* | 4/2014 | Kohlenberg .......... G06F 11/004 714/47.3 |
| 2014/0199980 A1* | 7/2014 | Rao ........................ H04W 4/18 455/418 |
| 2014/0215050 A1 | 7/2014 | Lu |
| 2014/0304389 A1 | 10/2014 | Reavis |
| 2014/0335795 A1* | 11/2014 | Wilbur ............. H04M 1/72457 455/67.11 |
| 2014/0379840 A1* | 12/2014 | Dao ................... H04L 67/2847 709/213 |
| 2015/0066587 A1 | 3/2015 | Glommen et al. |
| 2015/0200994 A1 | 7/2015 | Jain |
| 2015/0215738 A1* | 7/2015 | Frusina ................. H04L 47/38 455/426.1 |
| 2015/0223023 A1 | 8/2015 | Das et al. |
| 2015/0256641 A1* | 9/2015 | Agarwal ................ G06F 16/95 709/203 |
| 2015/0294377 A1 | 10/2015 | Chow |
| 2016/0004673 A1 | 1/2016 | Cook |
| 2016/0026720 A1 | 1/2016 | Lehrer et al. |
| 2016/0044127 A1* | 2/2016 | Filner ................ H04L 67/2847 709/213 |
| 2016/0110061 A1* | 4/2016 | Low .................... G06F 3/04817 715/772 |
| 2016/0154117 A1* | 6/2016 | Baudia ................. G01S 5/0027 342/357.31 |
| 2016/0191650 A1* | 6/2016 | Rong .................. H04L 67/306 709/213 |
| 2016/0217377 A1* | 7/2016 | Senarath ............ G06F 16/9537 |
| 2016/0226995 A1* | 8/2016 | Senarath ............ H04L 67/2847 |
| 2017/0091156 A9 | 3/2017 | Cook |
| 2017/0094490 A1* | 3/2017 | Ryan .................... H04W 4/021 |
| 2017/0187822 A1* | 6/2017 | Thomee ............ H04L 67/2847 |
| 2017/0192981 A1* | 7/2017 | Glover .............. H04L 67/2842 |
| 2017/0201856 A1* | 7/2017 | Wilbur .............. G01C 21/3667 |
| 2018/0097905 A1* | 4/2018 | Todasco ............ H04L 67/2847 |
| 2018/0115654 A1 | 4/2018 | Imai et al. |
| 2018/0167818 A1* | 6/2018 | Gale .................... G06F 21/567 |
| 2018/0176325 A1* | 6/2018 | Liang .................... H04L 67/02 |
| 2018/0189226 A1* | 7/2018 | Hofverberg ...... H04N 21/23106 |
| 2018/0270685 A1 | 9/2018 | Lee et al. |
| 2019/0149652 A1* | 5/2019 | Rodriguez Bravo . H04W 48/04 455/418 |
| 2019/0230185 A1* | 7/2019 | Dhanabalan ........ H04L 12/1407 |
| 2019/0317669 A1* | 10/2019 | Ober .................... G06F 3/061 |
| 2019/0373071 A1 | 12/2019 | Ramachandran et al. |

\* cited by examiner

FEATURE ACTIVATION CONTROL AND DATA PREFETCHING WITH NETWORK-CONNECTED MOBILE DEVICES

RELATED APPLICATIONS

Any and all applications for which a domestic priority claim is identified in the Application Data Sheet of the present application are hereby incorporated by reference under 37 CFR 1.57.

BACKGROUND

Many mobile device applications are run on client devices that send and receive data in real-time. As a result, these mobile device applications generally become unusable without an active Internet connection. Even with improvements to cellular coverage and a surge in Wi-Fi hotspots, mobile device users often complain about network fluctuations, especially in crowded places or while travelling. Even in metropolitan cities, the continuity of the network connections may not be perfect. With unreliable networks, limited bandwidth, and high latency, some mobile device applications are difficult for mobile device users to enjoy.

Additionally, geofencing is a technology that enables mobile device applications to trigger an alert or action when a mobile device enters, leaves, or stays in certain virtual geographic boundaries, also known as a geofence.

SUMMARY

In some embodiments, an electronic device is disclosed for intelligently prefetching data via a computer network. The electronic device can include a device housing, a user interface, a memory device, and a hardware processor. The user interface can receive multiple user inputs from a user. The memory device can store an application. The hardware processor can: communicate via a communication network with multiple systems; determine that the hardware processor is expected to be unable to communicate via the communication network; responsive to determining that the hardware processor is expected to be unable to communicate via the communication network, determine prefetch data to request prior to the hardware processor being unable to communicate via the communication network; request the prefetch data from one of the multiple systems via the communication network; receive the prefetch data via the communication network and store the prefetch data to the memory device prior to the hardware processor being unable to communicate via the communication network; and subsequent to the hardware processor being unable to communicate via the communication network, process the prefetch data with the application responsive to processing a first user input of the multiple user inputs with the application.

The electronic device of the preceding paragraph can include one or more of the following features: The hardware processor can determine the prefetch data to request by determining application data that is likely to be utilized by the application upon processing of a second user input of the multiple user inputs which is received subsequent to the hardware processor being unable to communicate via the communication network. The hardware processor can determine the prefetch data to request from a second user input of the multiple user inputs this is not processed by the application. The first user input can include a request to activate a feature of the application. The hardware processor can, subsequent to the hardware processor being unable to communicate via the communication network, process the prefetch data with the application for the first time responsive to processing the first user input with the application. The hardware processor can: determine when and for how long the hardware processor is expected to be unable to communicate via the communication network; and determine the prefetch data to request according to when and for how long the hardware processor is expected to be unable to communicate via the communication network. The hardware processor can determine from a second user input of the multiple user inputs that the hardware processor is expected to be unable to communicate via the communication network. The second user input can include a request to enter a mode in which wireless communications controlled by the hardware processor are disabled and the user interface continues to be active and usable by the user. The second user input can include an indication that the user intends to transport the device housing to a geographic location where the hardware processor is unable to communicate via the communication network. The hardware processor can use the second user input to generate a calendar event which indicates the geographic location as a place which the user is planning to visit or likely to travel through with the device housing. The electronic device includes a power source that can supply energy to the hardware processor, and the hardware processor can determine from an energy level of the power source that the hardware processor is expected to be unable to communicate via the communication network. The hardware processor can determine from a data message received via the communication network that the hardware processor is expected to be unable to communicate via the communication network, the data message being generated by a remote server and indicating a prediction that the hardware processor is expected to be unable to communicate via the communication network. The hardware processor can: determine a geographic location of the hardware processor; and determine from the geographic location that the hardware processor is expected to be unable to communicate via the communication network. The hardware processor can determine from a bandwidth associated with the communication network that the hardware processor is expected to be unable to communicate via the communication network.

In some embodiments, a method is disclosed for intelligently prefetching data via a computer network. The method can include: receiving, by a user interface of a mobile device, multiple user inputs from a user; storing an application to a memory device of the mobile device; and under control of a hardware processor: determining that the hardware processor is expected to be unable to communicate via a communication network; in response to determining that the hardware processor is expected to be unable to communicate via the communication network, determining prefetch data to request prior to the hardware processor being unable to communicate via the communication network; requesting the prefetch data from one of multiple systems via the communication network; receiving the prefetch data via the communication network and storing the prefetch data to the memory device prior to the hardware processor being unable to communicate via the communication network; and subsequent to the hardware processor being unable to communicate via the communication network, processing the prefetch data with the application for the first time responsive to processing a first user input of the multiple user inputs with the application.

The method of the preceding paragraph can include one or more of the following features: The determining the prefetch data to request can include determining application data that is likely to be utilized by the application upon processing of a second user input of the multiple user inputs which is received subsequent to the hardware processor being unable to communicate via the communication network. The first user input can include a request to activate a feature of the application. The method can further include determining when and for how long the hardware processor is expected to be unable to communicate via the communication network, and the prefetch data to request is determined according to when and for how long the hardware processor is expected to be unable to communicate via the communication network.

In some embodiments, non-transitory physical computer storage is disclosed. The non-transitory physical computer storage can include computer-executable instructions stored thereon that, when executed by one or more processors of a mobile device, are configured to implement a process. The process can include: determining that the one or more processors are expected to be unable to communicate via a communication network; in response to determining that the one or more processors are expected to be unable to communicate via the communication network, determining prefetch data to request prior to the one or more processors being unable to communicate via the communication network; requesting the prefetch data from one of multiple systems via the communication network; receiving the prefetch data via the communication network and storing the prefetch data to a memory device prior to the one or more processors being unable to communicate via the communication network; and subsequent to the one or more processors being unable to communicate via the communication network, processing the prefetch data responsive to processing a first user input.

The non-transitory physical computer storage of the preceding paragraph can include one or more of the following features: A second user input can be used for determining that the one or more processors are expected to be unable to communicate via the communication network. The second user input can include a request to enter a mode in which wireless communications controlled by the one or more processors are disabled and a user interface of the mobile device continues to be active and usable by a user of the mobile device.

Although the electronic devices, methods, or processes described in the preceding paragraphs can determine that a processor may be expected to be unable to communicate and then take actions responsive to or before/after being unable to communicate, the electronic devices, methods, or processes can additionally or alternatively determine that a processor may be expected to have a limited ability to communicate (sometimes referred to as limited connectivity) and then take the actions responsive to or before/after having the limited ability to communicate. The expected limited ability to communicate can be caused by an expected limited bandwidth of a communication channel, an expected limited total amount of data that may be communicated via a communication channel, an expected limited reliability of a communication channel (for example, such that the communication channel unexpectedly or unpredictability ceases permitting communication), or an expected limited signal strength of a communication channel (for example, such that the communication does not support communication with a correctable number of errors), among other possibilities.

In some embodiments, a mobile device is disclosed for dynamically implementing geofences. The mobile device can include a device housing, a memory device, and a hardware processor. The memory device can store geofence data to define multiple geofences including a first geofence and a second geofence, the first geofence being associated with a different virtual geographic boundary from the second geofence. The hardware processor can be in communication with the memory device. The hardware processor can: obtain geofencing rules according to a data fetch policy, the geofencing rules indicating how to identify a first set of geofences with a first location and a second set of geofences with a second location; identify the first set of geofences to monitor from the multiple geofences according to the geofencing rules and the first location of the device housing, the geofencing rules indicating how to identify the first set of geofences with the first location; detect a change in location of the device housing from the first location to the second location; and identify the second set of geofences to monitor from the multiple geofences according to the geofencing rules and the second location.

The mobile device of the preceding paragraph can include one or more of the following features: The first set of geofences and the second set of geofences can be mutually exclusive. The first set of geofences and the second set of geofences can include a common geofence. The memory device can store the geofence data in a relational database. The memory device can store the geofence data in a geo-indexed database. The hardware processor can: detect another location change of the mobile device from the second location to a third location; and trigger a first action based at least in part on the third location satisfying first criteria of a first geofence of the second set of geofences.

BRIEF DESCRIPTION OF THE DRAWINGS

Throughout the drawings, reference numbers are re-used to indicate correspondence between referenced elements. The drawings are provided to illustrate aspects of the features described herein and not to limit the scope thereof.

DETAILED DESCRIPTION

Introduction

Figure 1:
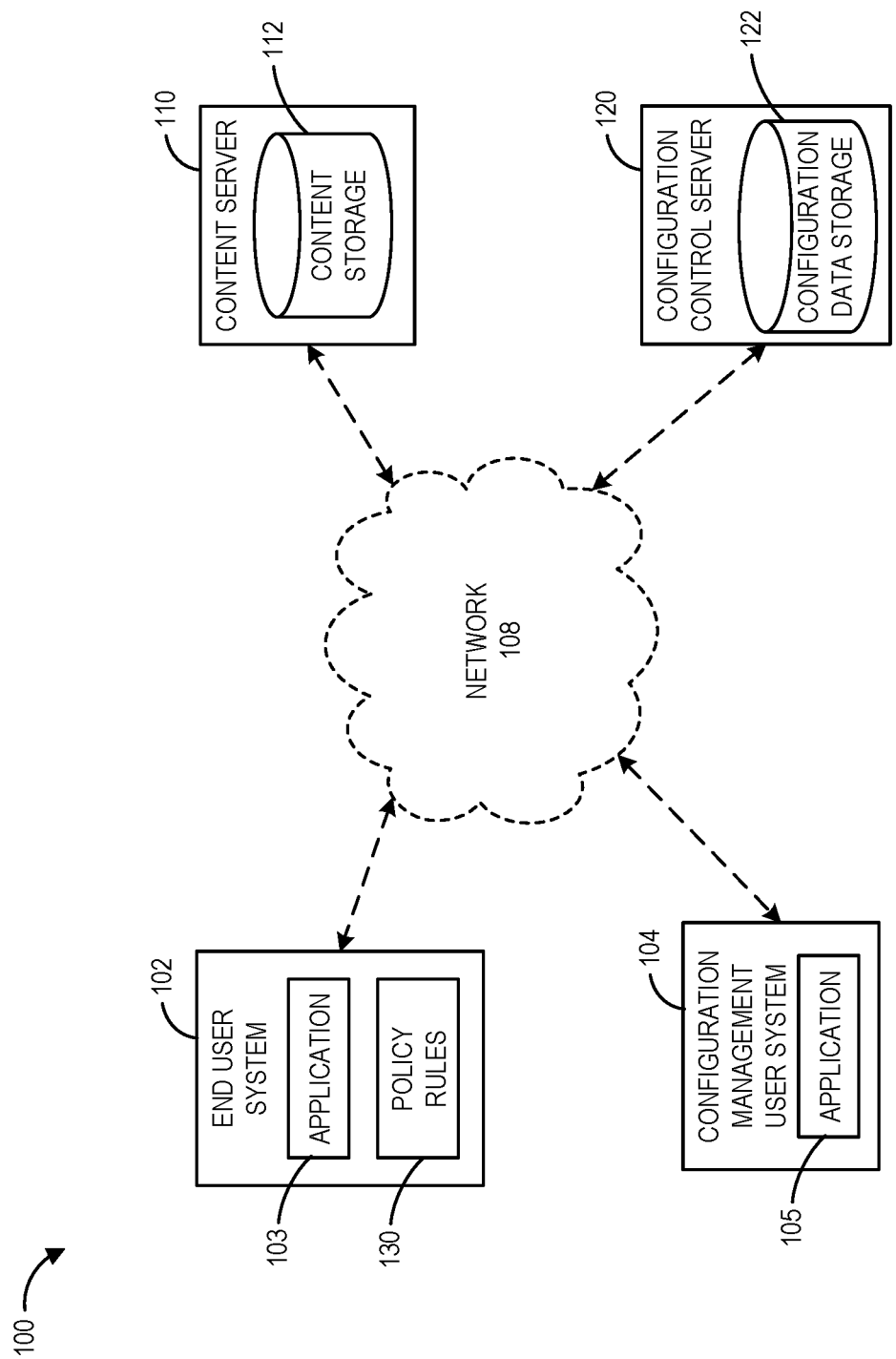
FIG. 1 depicts an example computing environment for feature activation control and data prefetching.

Geo-fencing technology can be implemented in numerous practical applications. For example, geo-fencing can be implemented in drone management (for instance, a sporting event can use geo-fencing to create a temporary no-fly zone that prevents drones from crossing a defined perimeter), fleet management (for instance, geo-fencing can alert a dispatcher when a truck driver breaks from his route), compliance management (for instance, network logs can record geo-fence crossings to document the proper use of devices and their compliance with established policies), asset management (for instance, a network administrator can set up alerts so that when a hospital-owned mobile device leaves the hospital grounds, the administrator can monitor the device's location and lock it down to prevent it from being used), marketing (for instance, a company may send real-time, limited-time product offers or personalized promotions to a consumer's mobile device when the mobile device enters a defined geographical area to encourage immediate actions or buying by a user of the mobile device), human resource management (for instance, an employee's smart card can send an alert to security if the employee attempts to enter an unauthorized, geo-fenced area), law enforcement (for instance, an ankle bracelet can alert authorities if an individual under house arrest leaves the premises), or home automation (for instance, when the home owner's smartphone leaves the home's geo-fenced perimeter, the thermostat lowers itself to a set temperature).

While geofencing has numerous applications, the maximum number of active geofences is generally restricted. For example, iOS SDK prevents any single mobile application from monitoring more than 20 geofences concurrently, and Android restricts a particular mobile device from monitoring more than 100 geofences concurrently. Geofencing also can create a performance or a battery penalty on a mobile device.

Conventionally, there are limits on how many geofences a mobile device, or a mobile application running on a mobile device, can monitor simultaneously. Systems, methods, and apparatuses described herein may solve this or other problems by dynamically activating geofences "just in time." As a mobile device is moved, the set of geofences monitored by the mobile device is changed to include those geofences that the mobile device is closest to or otherwise more likely to utilize. In this way, a particular geofence is monitored when it is likely to be triggered by the location of the mobile device, but may be deactivated (for instance, not monitored) when it will not, or is unlikely to, be triggered by the device location. As a result, systems, methods, and apparatuses described herein can provide for a hyper-personalized experience, such as based on the location of the mobile device or one or more other conditions. Moreover, the features described herein can facilitate a reduced processing burden, increased computational efficiency, or better responsiveness for or by the mobile device as the mobile device dynamically and responsively requests and processes data.

As an example, assume that 1000 geofences are associated with a particular mobile app, and further assume that the mobile application is prevented (for instance, by an operating system of the mobile device) from monitoring more than 20 geofences simultaneously. Systems, methods, and apparatuses described herein can filter using a set of rules (sometimes referred to as geofencing rules) the list of 1000 geofences down to those geofences that are more likely to be utilized. For example, the set of rules can be used to filter the list down to a subset that have boundaries within a threshold distance (for instance, a 500 m radius) from the location of the mobile device or are otherwise more likely to be utilized. In this way, a subset of the 1000 geofences (and in this case, 20 or fewer) may be monitored (for example, activated). The threshold distance can be configurable so that an administrator can adjust the size of the subset or monitoring as desired. Other characteristics can also be used for the set of rules, such as determined-associations, a time-of-time, among other possibilities.

In an implementation that includes filtering based on a threshold distance, as the location of the mobile device is changed, the filtering can be updated such that any geofences that are no longer within the threshold distance or are otherwise less likely to be utilized are deactivated (for instance, removed from monitoring) and any geofences that are now within the threshold distance, but previously were not within the threshold distance, or are otherwise more likely to be utilized are activated (for instance, monitored).

Points of interest to be monitored can be added to a lightweight relational database, which may contain a geo-index. The relational database can desirably further reduce the processing required to filter the list of potential geofences (which may, in some cases, be quite large). The results of the filter can be more quickly returned, for example, based on the latitude and longitude of a geofence to be monitored than using some other filtering approaches. Furthermore, storing geofences in a relational database, such as a geo-indexed database, can reduce the performance impact on the mobile device when working with large volumes of geofences.

By dynamically selecting which geofences are monitored based on the location of the mobile device, the limits on how many geofences a mobile device can monitor at a given time can be effectively bypassed or avoided. Furthermore, by monitoring those geofences that have boundaries within the configurable distance or are otherwise more likely to be utilized, geofences are less likely to be monitored when they have little to no chance of being triggered, thereby potentially freeing up geofence monitoring "slots" for other mobile applications on the mobile device. Further still, such a dynamic selection of geofences can reduce battery consumption of the mobile device since the mobile device may not "wake" the mobile application as frequently to deliver location updates.

A mobile device can, in certain implementations, prefetch data so that the mobile device may operate (potentially fully operate) without a network connection or with an inconsistent network connection. The mobile device can execute an application which is designed around the function of data (for instance, geo-location targeting rules) and may use native latitude-longitude data to evaluate rules and provide in-application experiences. The prefetching can be triggered by a variety of sources, such as local or remote to the mobile device, and responsive to data, such as local geo-locational data for the mobile device, user behaviors or interactions with the mobile device, or responsive to prompting from a server-side resource. For example, the mobile device can reach an edge of a geo-fence (which may, for instance, occur when a user of the mobile device walks into an airport), a user of the mobile device switches the mobile device into an airplane mode (such as may be defined or required by a government agency like the U.S. Federal Aviation Administration), or the Wi-Fi connection for the mobile device is connected or disconnected. A server-side prediction may trigger a prefetching of data due to a predicted outcome (for instance, a user may be driving down a road and about to hit an area with no cell service, so the mobile device can be instructed by a received server-side prediction to prefetch particular data)

The data prefetched by a mobile device can include device rules (for instance, geofences in an IF/THEN format, such as in a script file like JavaScript Object Notation), contextual information or small databases (for instance, subsets of customer or product databases or similar relational datasets), or content and media (for instance, images, videos, audio or other media files).

One example of the features described herein includes geo-triggered media loading. As a user of a mobile device may walk into an airport, the mobile device can detect the entry into the airport and accordingly automatically download media for an offline experience on the mobile device for the user. For instance, an audio or video subscription service installed or setup on the phone may automatically download a next 10 songs in a playlist or videos determined to be of interest to the user.

Another example of the features described herein includes predictive advertisement loading. A server-side predictive model can detect that a mobile device operated by a user may be likely to go offline. The server-side predictive model may predict that the mobile device may be likely to go offline because the user may be known to ride the subway most days at a consistent time. The server-side predictive model can moreover predict that the user often plays a game application while offline. A server running the server-side predictive model can thus send a trigger for the mobile device or the game application to download media data (for instance, images) and rules to the mobile device so that the game application may display advertisements while the mobile device is offline.

Yet another example of the features described herein includes predictive map generation. A route can be loaded (which can include or be used as pre-fetch rules) to a mobile device, and as the mobile device nears a geo-fence, the mobile device can prefetch the map images to attempt to ensure continued display experiences while the mobile device is travelling through an area known for lacking network service.

Yet a further example of the features described herein includes rules-based data loading for servicing remote locations. A customer relationship management (CRM) system can track appointments for a care provider who is scheduled for a house visit in a rural area. Prior to the house visit, a medical device in communication with the CRM system can prefetch a CRM dataset (for instance, patient health history) so that the care provider may have the CRM dataset available despite a network connection for the mobile device during the house visit. This may be coupled with a predictive model that can recommend additional data for prefetching, such as medical journals or guides, and that may be selected or determined based on a patient's symptoms collected prior to the care provider's arrival. The care provider may accordingly have the CRM dataset and other information that may prove relevant but might be otherwise unavailable during the house visit due to an unavailable or unreliable network connection by the mobile device.

Overview

With unreliable networks, limited bandwidth, and high latency, it is desirable for features of a mobile device to be functional, regardless of network connectivity. Generally, for a feature (such as an application running on the mobile device) to function in an unsteady or offline environment, the data that the application uses may be persisted locally on the mobile device for subsequent lookups. However, given an increasing number of applications installed on a typical smartphone, it can be impractical for a mobile device, such as a smartphone, to locally store all of the data associated with each application installed on the mobile device. And even if the mobile device did store all of the data for each application, at least some of the stored data may become stale.

Embodiments of the disclosed technology can utilize techniques for identifying that a mobile device may have limited or be without network connectivity and then pre-emptively (sometimes referred to as prefetching) download data relating to one or more applications likely to be used by the mobile device during limited or unavailable network connectivity. In this way, the one or more applications may be available for use (potentially with full capabilities) on the mobile device when requested, regardless of network connectivity, thereby improving the user experience of the mobile device.

Real-time interactions with a server can allow a mobile device to retain, or have access to, the latest and most-updated information. Accordingly, when a network is available and notwithstanding considerations such as cost of data usage, it can generally be desirable to retrieve data over the network just-in-time rather than to pre-emptively download the data for offline use. To balance the desire for obtaining the latest and most-updated information with the potential for limited or lost network connectivity, embodiments of the disclosed technology can utilize techniques for identifying a period of time when a mobile device may likely have limited or no network connectivity. The period of time can be imminent (for example, if a user provides an input to cause the mobile device to enter an airplane mode) or non-imminent (for example, a mobile device may not be expected to have network connectivity during a flight that a user is expected to take in a few days). Based on a determination that the mobile device may not have access to a reliable network, data for one or more features of the mobile device may be pre-emptively downloaded. In contrast, based on a determination that the mobile device may have access to a reliable network, data may not be pre-emptively downloaded.

In some cases, a mobile device can pre-emptively download the data at any time before the period of non-connectivity. For instance, continuing with the flight example above, the mobile device can download the data at any time, such as a random or periodic time, before the user's flight in a few days. In other instances, the mobile device can strategically determine when to prefetch the data. For example, the mobile device can download the data upon the occurrence of a particular event (for example, when the mobile device connected to Wi-Fi), in accordance with a particular schedule (for example, download the data at 3:00 AM, while the mobile device is unlikely to be in use by a user), or based on device or connectivity parameters (for example, download the data when device or data utilization is currently relatively low). By strategically prefetching the data, the mobile device can download the data at a time that may be less likely to inconvenience or take resources from the user of the mobile device.

The type of data that is prefetched can vary. For example, the prefetched data can include device rules (for example, one or more geofences), contextual information or small databases (for example, subsets of customer or product databases or similar relational datasets), or content and media (for example, images, videos, audio, or other media files). In some cases, the mobile device can determine which data to pre-emptively download.

Features disclosed herein therefore can include both (i) a determination of when a mobile device is expected to lose or have limited network connectivity and (ii) a determination of what data to prefetch in anticipation of a lost or limited network connectivity. The determinations can be made from or responsive to various inputs, including (a) behavioral data which may show an end user's plan or likelihood to leave network connectivity or to cause limited network connectivity for a mobile device, (b) device data which may reflect a characteristic of the mobile device, such as entering of a geographic area, an energy level of a power source of the mobile device, or monitored current network capabilities, that may suggest future limited network connectivity or loss of network connectivity for the mobile device, or (c) remote data generated by and received from a remote server and that can reflect processing by the remote server of the behavioral data or the device data for the mobile device as well as potentially behavioral data or device data from other mobile devices and that may suggest limited network connectivity or loss of network connectivity for the mobile device in the future. The output of the connectivity determination or data prefetch determination can be adjusted over time, such as by adjusting one or more algorithms used to control the determinations. In some implementations, the one or more algorithms can be adjusted by re-training or updated training (for instance, using the behavioral data, the device data, or the remote data or updates thereto) of a machine learning used to make the determinations.

User interfaces can be used to receive configuration inputs to control how or what data may be prefetched as described herein. The configuration inputs may be provided as part of deterministic, probabilistic, or measured instructions for controlling prefetching. The deterministic instructions can include rules that a configuration user may set based on known or fixed stages of navigation or behaviors by an end user. For instance, the deterministic instructions can indicate a desired action when an end user may be on step 3 of 4 of a funnel (such as through a webpage) or to preload a tracking pixel (sometimes referred to as a conversion pixel) on a check out form for a concluding page (such as a thank you page). The probabilistic instructions can include predictive triggers that a configuration user may set based on the behavioral data, the device data, or the remote data described herein. For instance, the probabilistic instructions can indicate a triggered action of preloading a live chat on step 3 of 4 of a funnel if an end user is predicted to be at least 90% likely to abandon the funnel. The measured instructions can include analytical threshold triggers based on data collected. For instance, the measured instructions can indicate a desired action responsive to a page load time satisfying an average load time threshold (such as 5 seconds) or responsive to a time on page satisfying a time on page threshold (such as 5 seconds). The user interfaces can be used to control monitoring of or actions associated with various characteristics, including those related to a device user (such as current historical [visitor], predicted values of the device user, or application session characteristics), content (such as device, location, time of day, referral, or channel source characteristics), or content (such as page, video, or screen characteristics).

Dynamic Feature Activation Control and Data Prefetching

FIG. 1 illustrates a computing environment 100 for implementing various features, including some or all of the feature activation control, data prefetching, and unsatisfactory network connection determination features, described herein. The computing environment 100 includes a network 108, an end user system 102, a configuration management user system 104, a content server 110, and a configuration control server 120. To simplify discussion, FIG. 1 illustrates one end user system, one configuration management user system, one content server, and one configuration control server, but multiple such systems or servers may be similarly used in the computing environment 100.

The end user system 102, the configuration management user system 104, the content server 110, and the configuration control server 120 may communicate with one another via the network 108. Although the network 108 is illustrated as one connected network, the network 108 can include multiple distinct or distributed networks. For example, the configuration management user system 104 can communicate with the configuration control server 120 via a separate and different network from the network that the configuration control server 120 uses to communicate with the end user system 102. The network 108 can include any type of communication network, such as one or more of a wide area network (WAN), a local area network (LAN), a cellular network, an ad hoc network, a satellite network, a wired network, a wireless network, a Wi-Fi network, a company intranet, the Internet, combinations of the same, or the like.

The end user system 102 can include any type of computing system. For example, the end user system 102 may include any type of computing device(s), such as a mobile device (for example, a laptop, smart phone, PDA, tablet, or the like), a desktop, a car-console device, a wearable device (for example, a smart watch or glasses with computing functionality), to name a few. The end user system 102 may include hardware and software components for establishing communications over the network 108. For example, the end user system 102 may be equipped with networking equipment and network software applications (for example, a browser) that facilitate communications via one or more networks (for example, the Internet or an intranet).

The end user system 102 can execute an application 103, such as with a processor of the end user system 102. The application 103 can be a browser or an application software (such as a native application or a progressive web application) that may be downloaded from an application marketplace or remote server (such as the content server 110) or received before receipt by the end user, stored on the end user system 102, and upon execution provide functionality to the end user system 102. The application 103 can collect and report data indicative of actions associated with the application 103. The actions can, for example, include a launching or closing of the application 103, collections of sensor data by the application 103, or end user interactions with the application 103.

The application 103 can operate according to policy rules 130 stored on the end user system 102. In one example, the policy rules 130 can include data that defines conditions or boundaries for one or more geofences. For example, the policy rules 130 can indicate how many or which geofences to monitor, when to trigger an event (for example, entrance and exit events), or geographical geofence boundaries. In another example, the policy rules 130 can include data that defines conditions for managing prefetching of data by the application 103 or the end user system 102, such as one or more conditions for triggering prefetching of data, one or more conditions usable for determining what data to prefetch upon determining to prefetch data, or how to process prefetched data prior to or subsequent to a loss of connection via the network 108.

The monitoring for a particular geofence can include processing of a geographic location of the end user system 102 by one or more applications installed on the end user system 102, such as the application 103. The processing can, for instance, facilitate a triggering of one or more determinations or actions based on or responsive to the geographic location of the end user system 102. The removal of monitoring for the particular geofence can result in the one or more applications no longer processing the geographic location of the end user system 102. Thus, the removal of monitoring for the particular geofence may mean that the one or more applications cease to be informed of the geographic location of the end user system 102 and accordingly may also no longer perform the processing associated with having access to the geographic location.

The application 103 or other application software installed on the end user system 102 can access one or more content pages of a content site or other content objects stored in content storage 112 of the content server 110. The content pages or content objects can be files or objects that may be accessed remotely and provided to the end user system 102. Accordingly, the content pages or content objects may be or include a media content, web pages, documents (such as pdf documents), videos, images, text, combinations of the same, or the like. The content server 110 may be a web server, an application server, a database server, combinations of the same, or the like.

The content server 110 can serve as an application marketplace from which the application 103 or updates thereto can be communicated to or downloaded by the end user system 102. The content server 110 can store content objects in the content storage 112. The content server 110 can transmit the content objects to the end user system 102 in response to a request for a content object or may push the content objects to the end user system 102.

The configuration control server 120 can include a configuration data storage 122 that may store configuration data for other devices, such as the end user system 102 or the configuration management user system 104. The configuration control server 120 can determine the configuration data by analyzing behavior or actions of the application 103, the end user system 102, or from analyzing traffic or data communicated on the network 108, as well as potentially behavior or actions of other applications or end user systems. Further, the configuration control server 120 can receive configuration data or updates thereto from the configuration management user system 104 to create or adjust the policy rules 130.

The configuration control server 120 can transmit or receive messages via the network 108, such as to or from the end user system 102 and or to or from configuration management user system 104. For example, the configuration control server 120 can transmit a message to one or both of the end user system 102 or the configuration management user system 104 providing or receiving the policy rules 130 or indications of or updates to the policy rules 130. The end user system 102 can implement the policy rules 130, such as part of rules engines, upon receipt. The configuration control server 120 can be implemented in computer hardware or software.

The configuration management user system 104 can include an application 105, such as a browser or an application software (such as a native application or a progressive web application), that can output an interface for presentation to a configuration user to permit the configuration user to create or adjust the policy rules 130. The application 105 may, for instance, can output a content page (such as a webpage) that may be provided by the configuration control server 120. The configuration management user system 104 can be any type of computing device including a mobile device (for example, a laptop, smart phone, PDA, tablet, or the like), a desktop, a car-console device, a wearable devices (for example, a smart watch or glasses with computing functionality), to name a few.

The configuration management user system 104 can be operated by configuration management users, such as marketing professionals, website operators, business users, operators of a content site or the content server 110, or any other individual who uses or manages mobile device policies, including for geofences or prefetching. The configuration management users may not be the end users of the application 103 in certain embodiments. The configuration management users can use the configuration management user system 104 to dynamically update the settings for mobile device policies, such as the policy rules 130.

Figure 2:
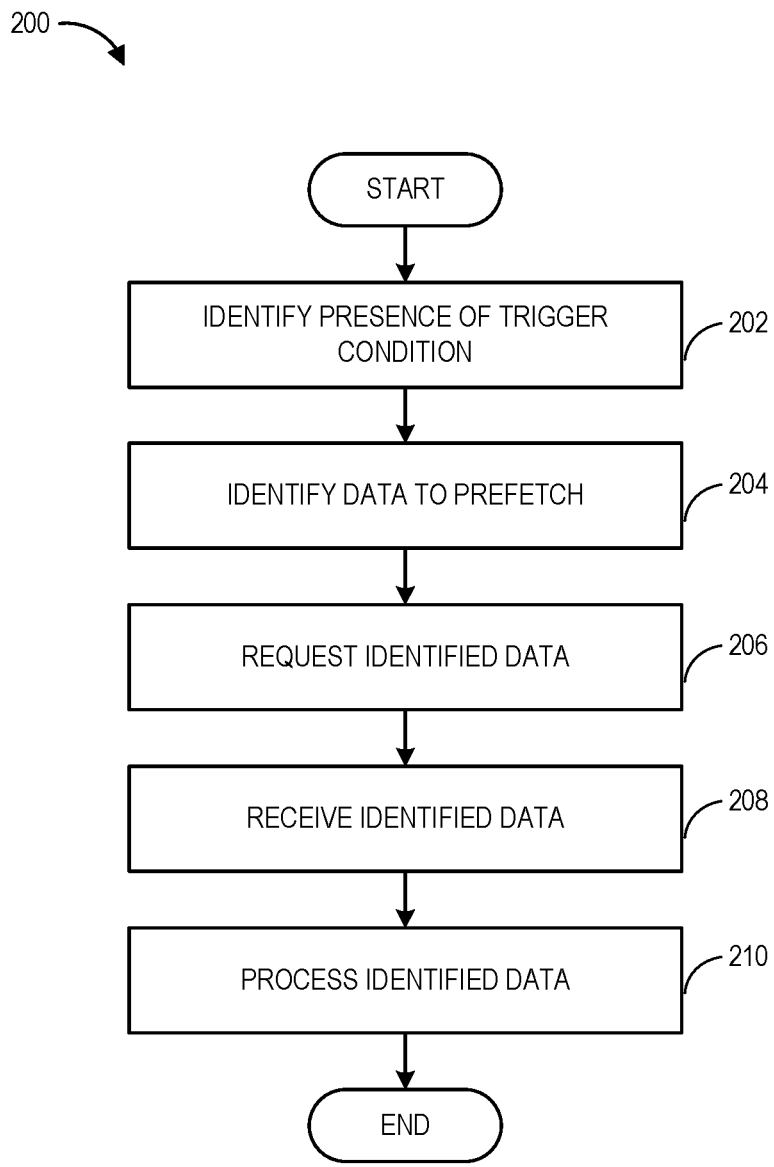
FIG. 2 is a data prefetch process performable in the computing environment of FIG. 1.

FIG. 2 is a data prefetch process 200 illustrating an example mode of operation of the computing environment 100 of FIG. 1 and may be implemented by the various components shown in the computing environment 100. The data prefetch process 200 may in particular illustrate processing by the end user system 102 in collaboration with the configuration control server 120. For convenience, the data prefetch process 200 is described in the context of the computing environment 100, but may instead be implemented by other systems described herein or other computing systems not shown. Advantageously, in certain embodiments, the data prefetch process 200 provides an approach by which the end user system 102 may attempt to anticipate a disruption in network connectivity via the network 108 and prefetech data expected to be used by the end user of the end user system 102 during the disruption. The end user system 102 may look to behavior data, device data, or remote data to anticipate the disruption or determine handling of prefeteching.

At block 202, the presence of the a trigger condition can be identified. For example, the end user system 102 can identify the presence of a trigger condition. The application 103 may, for instance, identify the trigger condition. The trigger condition can be determined from [i] behavioral data associated with the end user which be indicative of a likelihood that the end user will leave network connectivity or cause limited network connectivity for the end user system 102, [ii] device data which can reflect a characteristic of the end user system 102 that may suggest future limited network connectivity or loss of network connectivity for the end user system 102, or [iii] remote data generated by and received from another device and that can reflect processing by the another device of the behavioral data or the device data for the end user system 102 as well as potentially behavioral data or device data from other end user systems and that may suggest limited network connectivity or loss of network connectivity for the end user system 102 in the future. The trigger condition may be reported to the application 103 for identification, such as from a reported event (like an event detected and reported by another application or an operating system of the end user system 102 to the application 103) or a reported user input (like a user input detected by another application or an operating system of the end user system 102 and reported to the application 103), or determined by the application 103, such as from processing data like one or more user inputs to the application 103 or determining that data managed by the application 103 satisfies one or more criteria.

In general, the presence of the trigger condition can be linked with an unsatisfactory network connection for the end user system 102, such as an unsteady, weak, or missing signal connection. For example, the presence of the trigger condition can indicate that the end user system 102 may be likely to experience an unsatisfactory network connection at some point in the future (such as within a threshold period of time like 1 second, 2 seconds, 5 seconds, 10 seconds, 30 seconds, 1 minute, 2 minutes, 5 minutes, 10 minutes, 30 minutes, 1 hour, 2 hours, 5 hours, 1 day, 2 days, or 5 days or longer). The presence of the trigger condition may not mean that the end user system 102 will necessarily experience the unsatisfactory network connection. Rather, the presence of the trigger condition can indicate that the end user system 102 may have a set likelihood (such as with a 25%, 50%, or 75% probability) of experiencing the unsatisfactory network connection. The likelihood of the end user system 102 experiencing the unsatisfactory network connection can be determined by the end user system 102 using a predictive model or from predictive information or instructions received from the configuration control server 120. In other cases, the presence of the trigger condition indicates that the end user system 102 is expected with certainty or planned to experience the unsatisfactory network connection (such as within the threshold period of time).

A network connection can be considered unsatisfactory by the end user system 102 if one or more or all monitored connectivity parameters associated with the network connection fail to (or are expected to fail to) satisfy a connectivity threshold. The connectivity threshold can be based at least on any one or any combination of the connectivity parameters described herein. For example, the connectivity parameters can include one or more of a network bandwidth, a network speed, a download speed, an upload speed, a communication file size limit, a signal strength, a number of packets dropped, a bit rate, an error rate, a network generation, a network type, or the like.

The connectivity threshold may be considered to not be satisfied (and a network connection may thus considered to be unsatisfactory) if one or more of: the available bandwidth of a network does not satisfy a bandwidth threshold (for example, corresponding to a bandwidth level that is considered satisfactory for communication purposes), the available network speed does not satisfy a speed threshold, the available download speed does not satisfy a download speed threshold, the available upload speed does not satisfy a upload speed threshold, a file size to be transferred exceeds a communication file size limit or a set percentage thereof (for instance, 10%, 20%, 25%, 50%, 75%, or the like), the available signal strength does not satisfy a signal strength threshold, a number of packets dropped over a period of time satisfies a packets threshold, the bit rate does not satisfy a bit rate threshold, an error rate satisfies an error rate threshold, an available network generation (for example, 2G, 3G, 4G, 5G, LTE) does not satisfy a generation threshold, or a network type (for example, Wi-Fi, cellular, Bluetooth, etc.) does not match a desired network type.

On the other hand, a network connection can be considered satisfactory (or expected to be satisfactory) if the network connection is steady or online. Moreover, a network connection can be considered satisfactory if one or more or all monitored connectivity parameters associated with the network connection do (or are expected to) satisfy the connectivity threshold.

The trigger condition can vary across implementations. As an example, the trigger condition can correspond a scheduled event for an end user of the end user system 102, such as a meeting, an appointment, a lecture, a class, a concert, a movie, a flight, or the like. In some such cases, the end user system 102 can identify the presence of the scheduled event from a calendar or schedule associated with or managed via the end user system 102. For example, the end user system 102 can parse calendar data for the end user to identify the presence of one or more scheduled events.

As another example, the trigger condition can correspond to a particular location for the end user system 102. In some such cases, the end user system 102 can identify the presence of the trigger condition according to a location of the end user system 102. For example, the end user system 102 can identify the presence of the trigger condition by determining that the end user system 102 has entered a particular area or crossed over a particular geographic boundary. To make this determination, the end user system 102 can track or monitor the location of the end user system 102, such as using GPS, RFID, cellular data, Wi-Fi or another wireless connection protocol which may be incorporated in the end user system 102.

As yet another example, the trigger condition can correspond to one or more metrics and a metrics threshold for the end user system 102. In some such cases, the end user system 102 can identify the presence of the trigger condition by determining that the one or more metrics satisfies the metrics threshold. For instance, the one or more metrics can include a remaining energy level associated with a power source of the end user system 102. From determining that the remaining energy level does not satisfy an energy level threshold, the end user system 102 can identify the presence of the trigger condition.

As a further example, the trigger condition can correspond to a predictive trigger for the end user system 102. In some such cases, the end user system 102 can identify the presence of the trigger condition from a prediction that an event will happen for the end user system 102 or its end user. The predicted event can vary across implementations. For instance, the end user system 102 can predict that the end user system 102 will enter into a particular area or cross a particular geofence boundary. In another instance, the end user system 102 can predict that the end user of the end user system 102 is or will be navigating to or through an area with an unsatisfactory or limited connectivity network from an input to the end user system 102, such as the application 103 (which may be serving to provide navigation or communication functionality for the end user), that indicates the end user system 102 may or will likely enter into the area.

As yet a further example, the trigger condition can correspond to a connectivity threshold associated with a network connection for the end user system 102. In some such cases, the end user system 102 can identify the presence of the trigger condition by determining that a network connection is lost (for example, no network connection is available or for the end user system 102 is not connected to the network 108) or terminated (for example, by turning on an airplane mode or turning off cellular data for the end user system 102).

As an additional example, the trigger condition can correspond to a user action with the end user system 102. For example, if the user action is providing a user input to the end user system 102 to place the end user system 102 in an airplane mode, the end user system 102 can identify the presence of the trigger condition from receiving the user input.

At block 204, data to prefetch can be identified. For example, the end user system 102 can identify data to prefetch. The end user system 102 may determine to identify the data to prefetch responsive to the end user system 102 identifying the presence of the trigger condition at block 202. The data to be prefetched by the end user system 102 can include device rules (for instance, geofencing rules), contextual information or small databases (for instance, subsets of customer or product databases or similar relational datasets), content and media (for instance, images, videos, audio, or other media files), or advertisement data, among other possible data.

The end user system 102 can identify the data to prefetch according to a data prefetch policy. For example, the data prefetch policy can indicate which data to prefetch (such as how to select or determine data for prefetching or how much data to prefetch or whether to prefetch a particular batch of data for multiple different applications that is designated to be prefetched upon satisfaction of a particular condition), when to prefetch the data (such as upon occurrence of an event or at a set time that may be based on a prediction of how soon the end user system 102 may lose or have limited connectivity and how soon the end user system 102 may be expected to present the prefeteched data), how to prefetch the data (such as which source from which to request the data or how to structure a request for the data), how to process the prefetched data (such as to delay processing or process immediately upon receipt), or the like. The data prefetch policy can indicate to prefetch data which is predicted to be used by the end user of the end user system 102 in the future. The data prefetch policy can be determined from the policy rules 130 and may be determined with or without input from the end user.

The end user system 102 can identify the data to prefetch from various inputs, such as the input data described with respect to block 202, including [i] behavioral data associated with the end user which can be indicative of a likelihood of the end user to leave network connectivity or cause limited network connectivity for the end user system 102 or what action or activity the end user may use the end user system 102 for during the time of limited or no network connectivity, [ii] device data which can reflect a characteristic of the end user system 102 that may suggest future limited network connectivity or loss of network connectivity for the end user system 102, including a potential duration of the time of limited or no network connectivity or an indication of what action or activity the end user may use the end user system 102 for during the time of limited or no network connectivity, or [iii] remote data generated by and received from another device and that can reflect processing by the another device of the behavioral data or the device data for the end user system 102 as well as potentially behavioral data or device data from other end user systems and that may suggest what data to prefetch in anticipation of the time of limited or no network connectivity. The various inputs can be input to one or algorithms, which provide identifications of the data to prefetch as an output.

At block 206, the data identified at block 204 can be requested. For example, the end user system 102 can request the data to be prefetched via the network 108 from another device, such as the content server 110.

At block 208, the data identified at block 204 can be received. For example, the end user system 102 can receive the data to be prefetched via the network 108 from the another device, such as the content server 110. The content server 110 may have used the request from the end user system 102 to retrieve the data to be prefeteched from the content storage 112 and then transmitted the data to be prefetched via the network 108.

At block 210, the data identified at block 204 can be processed. For example, the end user system 102 can process the data to be prefetched by storing the data to be prefetched to a memory device for later use by the application 103, such as after the end user system 102 experiences limited or loss of network connectivity. The data to be prefetched may be processed by the application 103 responsive to processing a user input with the application 103, but may not be processed prior to processing the user input with the application 103. The data to be prefetched may be processed by the application 103 after the end user system 102 experiences limited or loss of network connectivity and not before the end user system 102 experiences limited or loss of network connectivity.

Data Prefetch Example Implementations

As a first example implementation of the data prefetch process 200 of FIG. 2, the end user system 102 can pre-emptively download media before the end user of the end user system 102 attends an event (such as boards a flight). The end user system 102 can identify the presence of a trigger condition, which can be an event (for instance, the flight) being set, scheduled, or upcoming for the end user, by determining from calendar data, email confirmation, or interaction with an event application that the end user is scheduled for the event.

Responsive to identifying the presence of the trigger condition, the end user system 102 can identify data to prefetch. The data to prefetch can include media, such as videos (for example, that a user may want to watch during the flight), songs in a playlist, or advertisements for presentation during or between the the videos or songs, or other data that the user may be expected to be presented during the event. The end user system 102 may identify a period of time associated with the event, which can include an event duration (for instance, from the boarding pass or boarding/landing time), as well as a buffer period (which may be customized to an expected behavior by the end user, such as typical event arrival times) prior to the event to account for an early arrival to the event by the end user.

The end user system 102 may determine when to prefetch the data, such as a time or range of times in which to download. For instance, the end user system 102 can determine to prefetch the data when the end user system 102 may have or at least typically have a robust or consistent network connection (for example, at 4:00 AM when the end user may likely be sleeping and the end user may have access to a Wi-Fi connection) or at a set amount of time prior to the period of time when the end user system 102 is expected to experience limited or loss of network connectivity via the network 108 (for example, 12 or 24 hours in advance). The end user system 102 may delay completing performance of certain user-requested actions, such as actions that may adversely impact an ability of the end user system 102 to successfully prefetch the data (for example, entering an airplane mode responsive to a user input to enter an airplane mode), until the end user system 102 successfully prefetches the data.

As a second example implementation of the data prefetch process 200 of FIG. 2, the end user system 102 can pre-emptively download geofence rules or user data prior to, or upon, entering a particular geofence or location. The end user system 102 can identify the presence of a trigger condition, which can include the end user system 102 entering or passing through a location (for example, a boundary of a geofence), by determining that the end user is expected to be located in the location or that the user may be on track across the location (for instance, the end user may drive down a road with the end user system 102 and be approaching an area known to have no network connectivity, and the end user system 102 may automatically determine this approaching limited connectivity situation from directions being followed in a mapping application on the end user system 102) with the end user system 102.

The end user system 102 can identify data to prefetch, which can include geofencing rules or user data like map data. The end user system 102 may identify a period of time associated with the location, such as a period of time until or at which the end user system 102 is expected to reach the location, which can be used to control what or how much data may be prefetched. The end user system 102 can determine when to download the data, such to download the data once the end user system 102 is within a threshold distance from the location or to delay the download in order to avoid unnecessarily downloading data (for instance, if the end user happens to take a different route than expected).

As a third example implementation of the data prefetch process 200 of FIG. 2, the end user system 102 can pre-emptively download data in response to a user providing a command (for example, a user input) to switch the end user system 102 into an airplane mode (which can be a mode in which some or all wireless communication functions of the end user system 102 may be disabled).

The end user system 102 can identify the presence of a trigger condition, which can be the end user system 102 receiving or anticipating receiving a particular command indicative of the end user desiring to limit or disable network connectivity (for example, an airplane mode activation or activation of a menu one, two, three, or more steps prior to but likely to result in activation of the airplane mode).

The end user system 102 can identify data to prefetch, which can include media, advertisements, images, text, or the like, among other data. The end user system 102 can identify a period of time associated with the user input, which can be immediate or indicative of a change in a relatively short period of time in which the end user system 102 is expected to have limited or lost its network connection. The end user system 102 can determine when to download the data, which in this case may be immediately or within a threshold period of time (such as 0.5, 1, 2, 3, 5, 7, 10, 30, or 60 seconds or more). Notably, the end user system 102 may delay entry into the airplane mode for the purposes of completing the prefetch of data.

Geofencing Activation Control

The end user system 102 of FIG. 1, can pre-emptively download data in preparation for the end user system being without a network connection at some time in the future. In some cases, the data that is downloaded can relate to one or more features of a mobile application, such as geofencing technology features.

Figure 3:
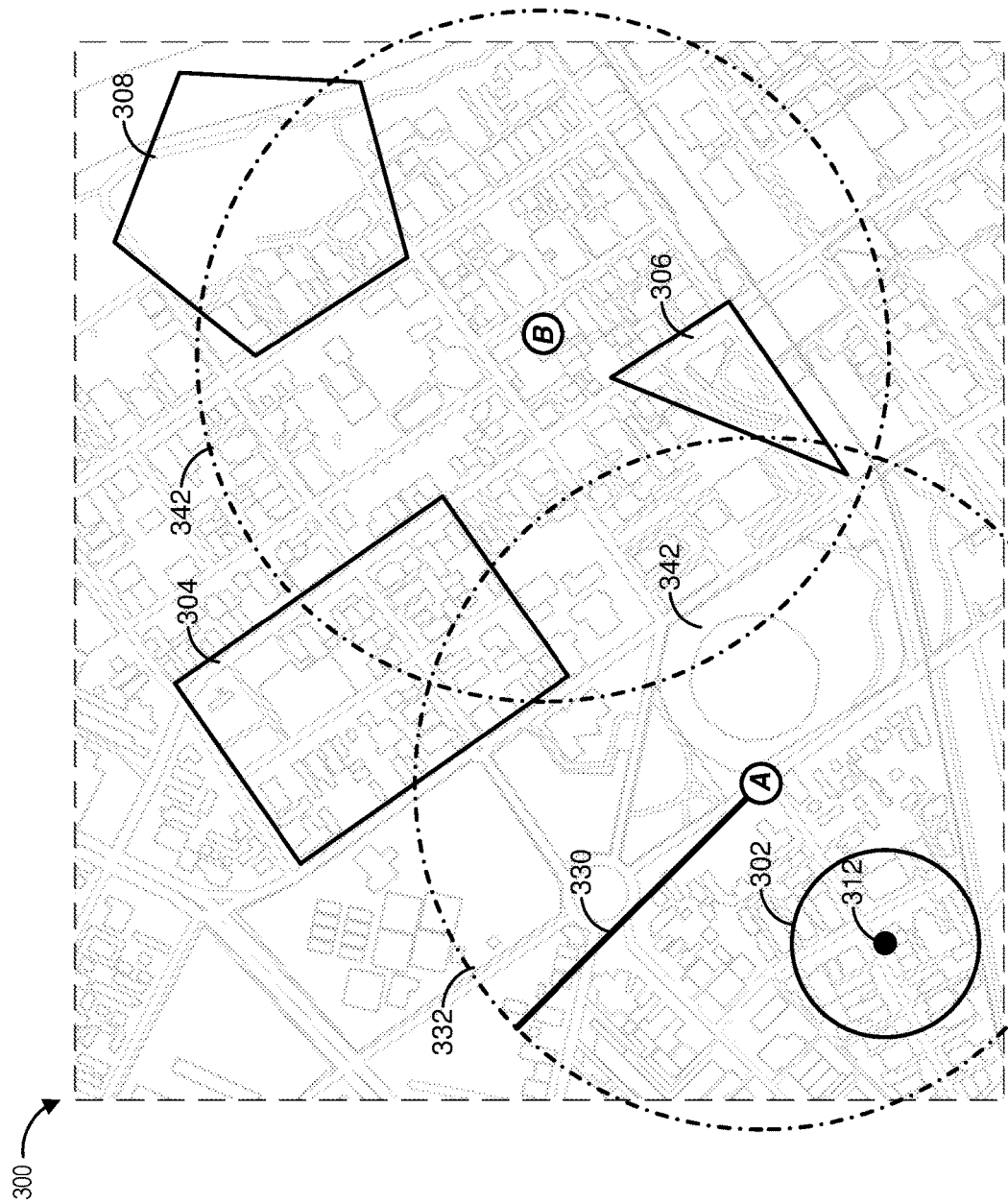
FIG. 3 is a diagram of multiple example geofences that may be associated with an end user system in the computing environment of FIG. 1.

Geofencing technology can enable a mobile application on a mobile device to trigger an alert or action when the mobile device enters, leaves, or stays within in certain geographic boundaries, also known as geofences. Mobile application administrators can define the boundaries of the geofences (for example, by longitude and latitude or through user-created or Web-based maps), and the location of the mobile device can be monitored using GPS, RFID, cellular data, Wi-Fi or another wireless connection protocol. FIG. 3 is a diagram 300 illustrating a first geofence 302, a second geofence 304, a third geofence 306, and a fourth geofence 308 that may be associated with the end user system 102 of FIG. 1.

The end user system 102 can use a set of rules (sometimes referred to as geofencing rules) to filter a list of geofences down to those geofences that have boundaries within a threshold distance (for example, a 500 m radius) from the location of the end user system 102 or are otherwise more likely to be utilized. In this way, a subset of the geofences on the list of geofences (for example, 20 or fewer) may be monitored (for example, activated). The threshold distance can be configurable so that a configuration user of the configuration management user system 104 can adjust the size of the subset or monitoring as desired.

The geofencing rules can remain in place at the end user system 102 as the location of the end user system 102 changes. For example, the geofencing rules can indicate to update the filtering when the end user system 102 moves. In this way, the geofences can be updated such that any geofences that are no longer within the threshold distance or are otherwise less likely to be utilized are deactivated (for example, removed from monitoring) and any geofences that are now within the threshold distance, but previously were not within the threshold distance, or are otherwise more likely to be utilized are activated (for example, monitored).

To reduce the processing required to filter the list of potential geofences (which could, in some cases, be quite large) by the end user system 102, points of interest to be monitored can be added to a lightweight relational database, which may contain a geo-index. In this way, the results of the filter can be quickly returned, for example, according to the latitude and longitude of a geofence to be monitored. Furthermore, storing geofences in a relational database, such as a geo-indexed database, can reduce the performance impact on the end user system 102 when working with large volumes of geofences.

By dynamically selecting which geofences are monitored according to the geofencing rules, the limits on how many geofences the end user system 102 can monitor may be effectively bypassed or avoided. Furthermore, by the end user system 102 monitoring those geofences that have boundaries within the configurable distance or are otherwise more likely to be utilized, geofences are less likely to be monitored when they have little to no chance of being triggered, thereby potentially freeing up geofence monitoring "slots" for other mobile applications on the end user system 102. Further still, such a dynamic selection of geofences can reduce power consumption of the end user system 102 because the end user system 102 may not "wake" the mobile application as frequently to deliver location updates.

The end user system 102 can manage which geofences of the first geofence 302, the second geofence 304, the third geofence 306, and the fourth geofence 308 are monitored at a given time, and the management of geofences can be based at least on the location of the end user system 102.

As a first example, at a first point in time, the end user system 102 can be located at Location A. To manage which geofences are monitored at the first point in time, the end user system 102 can determine which geofences are within a threshold distance 330 from the end user system 102. In this instance, the threshold distance 330 can create a circular boundary 332 around the location of the end user system 102 (for example, Location A). As illustrated in FIG. 3, the circular boundary 332 can overlap with at least a portion of the first geofence 302, the second geofence 304, and the third geofence 306. And the circular boundary 332 may not overlap with the fourth geofence 308. In view of this, at the first point in time, the first geofence 302, the second geofence 304, and the third geofence 306 can be monitored, and the fourth geofence 308 can be inactive or not monitored.

As a second example, at a second point in time, the end user system 102 can be located at Location B. In this instance, a circular boundary 342 (created by a threshold distance 340) around Location B can overlap with at least a portion of the second geofence 304, the third geofence 306, and the fourth geofence 308. And the circular boundary 342 may not overlap with the first geofence 302. In view of this, at the second point in time, the second geofence 304, the third geofence 306, and the fourth geofence 308 can be monitored, and the first geofence 302 can be inactive or not monitored.

The threshold distance 330 or the threshold distance 340 can vary across. For example, the threshold distance 330 or the threshold distance 340 can be set by the end user system 102, the configuration management user system 104, or another system. In this way, the threshold distance 330 or the threshold distance 340 can be adjusted so that the size of the circular boundary 332 or the circular boundary 342 can be increased or decreased. This can allow the circular boundary 332 or the circular boundary 342 to capture more or fewer geofences. In some cases, the threshold distance 330 or the threshold distance 340 is dynamically updated so that the number of geofences captured within the circular boundary 332 or the circular boundary 342 may not be greater than a threshold amount. For example, iOS SDK prevents any single mobile application from monitoring more than 20 geofences concurrently. In some such cases, the threshold distance 330 or the threshold distance 340 can dynamically adjust so that the number of geofences captured within the circular boundary 332 or the circular boundary 342 may not be greater than 20.

The first geofence 302 is illustrated as a circular area defined by a radius around a point of interest 312, the second geofence 304 is illustrated as a rectangular area, the third geofence 306 is illustrated as a pentagonal area, and the fourth geofence 308 is illustrated as a triangular area. The location, shape, or size of the boundary of a geofence can vary across implementations. For example, the location of a point of interest, the location of a geofence, the shape of the boundary, or the size of the boundary can be set by the end user system 102, the configuration management user system 104, or another system.

Prefetching Geofencing Rules

Geofences can be controlled on mobile devices according to policy rules, such as geofencing rules. The geofencing rules can indicate which geofences are available, which geofences to monitor and when, how to select a set of geofences, when to activate or deactivate particular geofences, how many geofences can be active at a particular time, a scope or barrier associated with a geofence, or the like. In some cases, geofencing rules can update over time. For example, configuration management users can use the configuration management user system 104 to update the geofencing rules. As another example, the end user system 102 can pre-emptively download the geofence rules in preparation for the end user system being without a network connection at some time in the future.

Figure 4:
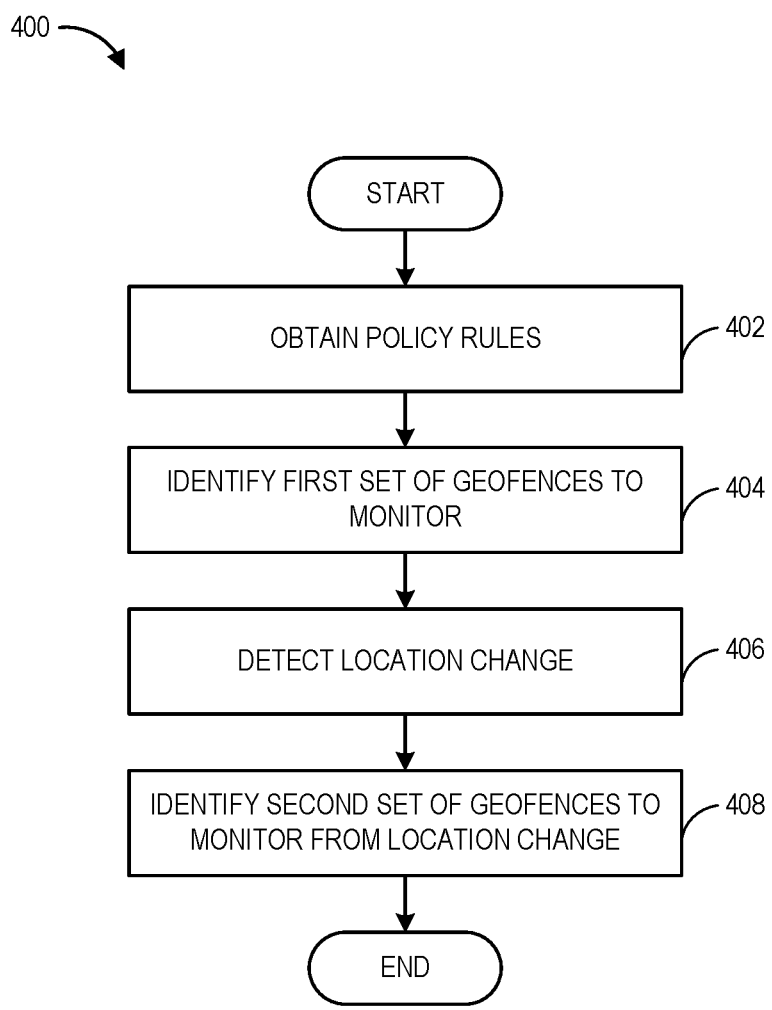
FIG. 4 illustrates an example geofencing rules management process performable in the computing environment of FIG. 1.

FIG. 4 illustrates a geofencing rules management process 400. The geofencing rules management process 400 illustrates an example mode of operation of the computing environment 100 and may be implemented by the various components shown in the computing environment 100. For convenience, the geofencing rules management process 400 is described in the context of the computing environment 100, but may instead be implemented by other systems described herein or other computing systems not shown.

At block 402, policy rules can be obtained. For example, the end user system 102 can obtain the policy rules 130, which can include geofencing rules, or an update to the policy rules for the application 103 running on the end user system 102. The end user system 102 can obtain the policy rules 130 or an update thereto as part of a data prefetch policy or a data fetch policy. For example, the end user system 102 can pre-emptively download the policy rules 130 or an update thereto in preparation for the end user system 102 being without a network connection at some time in the future.

At block 404, a first set of geofences to monitor can be identified. For example, the end user system 102 can identify the first set of geofences to monitor from the geofencing rules and a first location of the end user system 102. The geofencing rules can indicate how to filter down a list of geofences associated with the application 103. The end user system 102 can use the geofencing rules and location data (for example, native lat/long location data) to determine which geofences are within a threshold distance from the first location. In this way, the end user system 102 can identify the first set and may activate or monitor the geofences of the first set.

At block 406, a location change can be detected. For example, the end user system 102 can detect a location change of the end user system 102 from the first location to a second location, such as from monitored GPS, RFID, cellular, Wi-Fi, or other location-identifying data.

At block 408, a second set of geofences to monitor can be identified from the location change detected at block 406. For example, the end user system 102 can identify a second set of geofences to monitor from the geofencing rules and the second location. The identification of the second set of geofences to monitor can be performed using a similar or the same approach as the approach used to identify the first set of geofences to monitor at block 404.

Example Computer System

Figure 5:
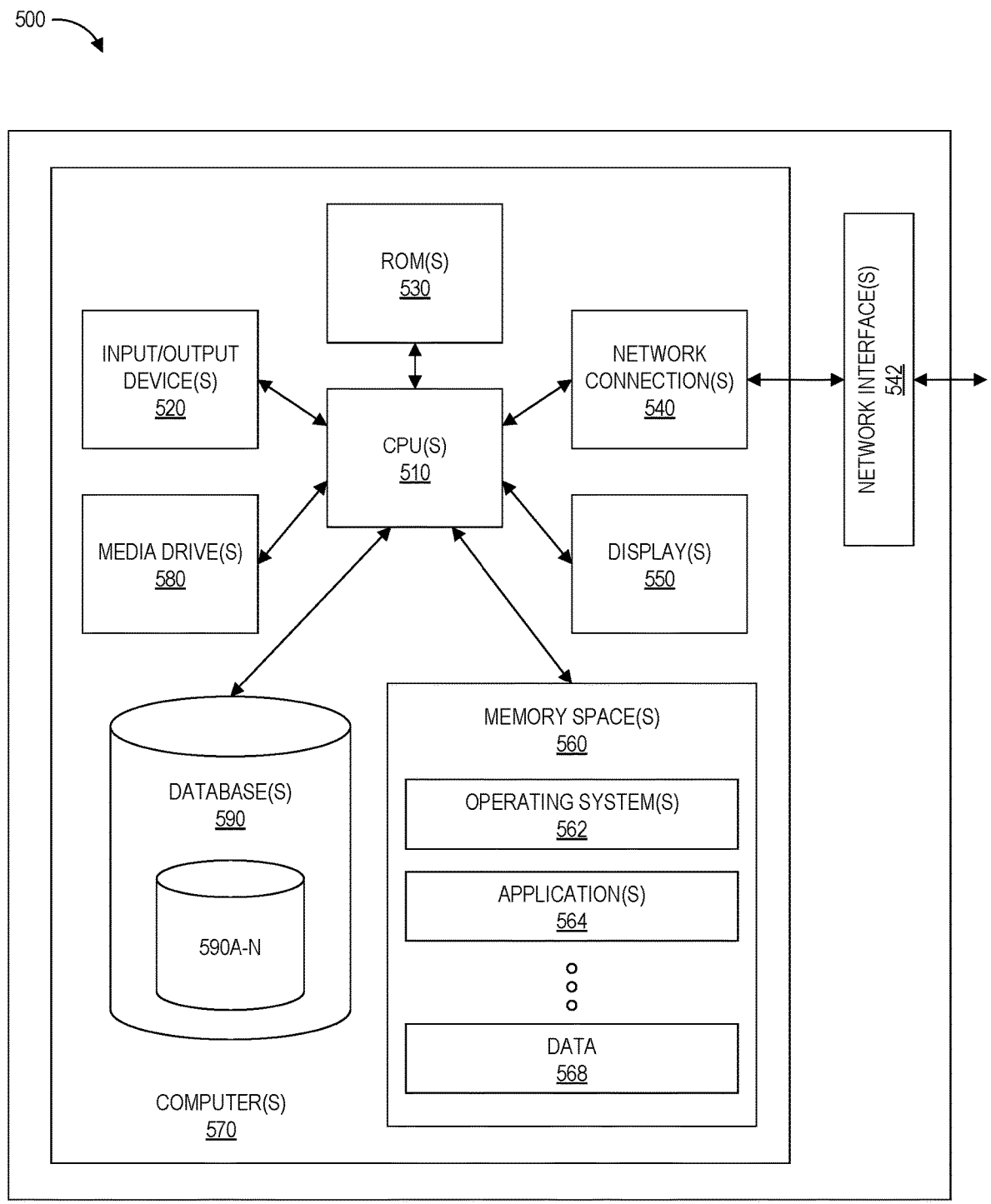
FIG. 5 illustrates example components usable to construct one or more of the devices, systems, or servers in the computing environment of FIG. 1.

FIG. 5 illustrates a computer system 500 usable to construct one or more of the devices, systems (for example, the end user system 102 or the configuration management user system 104), servers (for example, the content server 110 or the configuration control server 120), or the like within the computing environment 100 of FIG. 1.

As shown in FIG. 5, the computer system 500 can include (i) a processor(s) (CPUs) 510, (ii) an input/output device(s) 520 configured to allow users to input and output information and interact with the computer system 500 as well as transfer and receive data or capture data with one or more sensors, (iii) a read only memory device(s) (ROMs) 530 or equivalents to provide nonvolatile storage of data or programs, (iv) a display(s) 550 such as a computer monitor or other display device, (v) a network connection(s) 540 and a network interface(s) 542 configured to allow the computer system 500 to connect to other systems, servers, or portable devices, as well as a memory space(s) 560 and a database(s) 590. The database(s) 590 may be further divided or distributed as sub-database(s) 590A-590N, with the sub-database(s) storing feature or function specific information associated with a particular feature or function. The various components shown in FIG. 5 may be incorporated in a computer(s) 570. It is noted that the various components shown in FIG. 5, including the database(s) 590, are typically included as part of the computer(s) 570, however, they may be external to the computer(s) 570 in some aspects. For example, the database(s) 590 may be external to the computer(s) 570 and may be part of a separate database computer system or networked database system. In some instances, the computer system 500 may be a computing device like a desktop computer, mobile phone, or a server.

The memory space(s) 560 may include DRAM, SRAM, FLASH, hard disk drives, or other memory storage devices, such as a media drive(s) 580, configured to store an operating system(s) 562, an application program(s) 564, and data 568, and the memory space(s) 560 may be shared with, distributed with or overlap with the memory storage capacity of the database(s) 590. In some aspects, the memory space(s) 560 may include the database(s) 590 or in some aspects the database(s) 590 may include the data 568 as shown in the memory space(s) 560. The data stored in the memory space(s) 560 or the database(s) 590 may include information, such as event data, event processing rules, data processing routines, or other types of data described herein.

Additional Aspects and Terminology

Many other variations than those described herein will be apparent from this disclosure. For example, depending on the aspects, certain acts, events, or functions of any of the algorithms described herein can be performed in a different sequence, can be added, merged, or left out altogether (for example, not all described acts or events are necessary for the practice of the algorithms). Moreover, in certain aspects, acts or events can be performed concurrently, for example, through multi-threaded processing, interrupt processing, or multiple processors or processor cores or on other parallel architectures, rather than sequentially. In addition, different tasks or processes can be performed by different machines or computing systems that can function together.

As used herein, the terms "application" or "program," in addition to having their ordinary meanings, can refer to an executable code that when executed by a hardware processor causes the hardware processor to perform operations in accordance with the executable code. In some instances, an application or a program, moreover, may refer to executable code that was previously compiled.

One or more parts of or all of the configuration control server 120 can be implemented in a distributed cloud platform that provides redundant or geographically dispersed access (for example, using a Multi-Content Delivery Network). Although not illustrated herein, the implementation of the distributed cloud platform can be similar in some respects to the distributed cloud platform described and illustrated with respect to FIG. 25 of U.S. Pat. No. 8,805, 946, titled "SYSTEM AND METHOD FOR COMBINING CONTENT SITE VISITOR PROFILES," which is incorporated by reference herein in its entirety.

One or more of the features, devices, servers, or systems described herein can be combined with or performed along with one or more of the features, devices, servers, or systems described in U.S. Pat. No. 8,843,827, titled "ACTIVATION OF DORMANT FEATURES IN NATIVE APPLICATIONS," U.S. Pat. No. 9,363,311, titled "DELIVERY OF INSTRUCTIONS IN HOST APPLICATIONS," U.S. Pat. No. 9,807,184, titled "CONFIGURATION OF CONTENT SITE USER INTERACTION MONITORING IN DATA NETWORKS," and U.S. Pat. No. 10,327,018, titled "ENGAGEMENT TRACKING IN COMPUTER DATA NETWORKS." The disclosures of the foregoing patents are hereby incorporated by reference in their entirety.

One or more user inputs described in this disclosure may be received using one or more different mechanisms. For example, user interface controls may be selected by a user using one or more input options, such as a mouse, touch screen input, or keyboard input, among other user interface input options. The user interface controls selected by the user can include one or more of buttons, dropdown boxes, select boxes, text boxes, check boxes, slider controls, or other user interface controls.

The various illustrative logical blocks, modules, and algorithm steps described in connection with the aspects disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the aspects disclosed herein can be implemented or performed by a machine, a microprocessor, a state machine, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A hardware processor can include electrical circuitry or digital logic circuitry configured to process computer-executable instructions. In another aspect, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the aspects disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements or states. Thus, such conditional language is not generally intended to imply that features, elements or states are in any way required for one or more aspects or that one or more aspects necessarily include logic for deciding, with or without author input or prompting, whether these features, elements or states are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, certain aspects described herein can be embodied within a form that does not provide all of the features and benefits set forth herein, as some features can be used or practiced separately from others.

What is claimed is:

1. An electronic device for intelligently prefetching data via a computer network, the electronic device comprising:
   a device housing;
   a user interface configured to receive a plurality of user inputs from a user;
   a memory device configured to store an application; and
   a hardware processor configured to:
      communicate via a communication network with a plurality of systems,
      determine from a first user input of the plurality of user inputs that the hardware processor is expected to be unable to communicate via the communication network, the first user input indicating a request to activate a mode in which wireless communications by the hardware processor via the communication network are disabled and the user interface continues to be active and usable by the user,
      responsive to the first user input:
         delay activating the mode in which the wireless communications by the hardware processor via the communication network are disabled and the user interface continues to be active and usable by the user,
         determine prefetch data to request prior to activating the mode in which the wireless communications by the hardware processor via the communication network are disabled and the user interface continues to be active and usable by the user,
         request the prefetch data from one of the plurality of systems via the communication network, and
         receive the prefetch data via the communication network and store the prefetch data to the memory device,
      responsive to receipt of the prefetch data, activate the mode in which the wireless communications by the hardware processor via the communication network are disabled and the user interface continues to be active and usable by the user, and
      subsequent to the activating the mode in which the wireless communications by the hardware processor via the communication network are disabled and the user interface continues to be active and usable by the user, process the prefetch data with the application responsive to processing a second user input of the plurality of user inputs with the application.

2. The electronic device of claim 1, wherein the hardware processor is configured to determine the prefetch data to request by determining application data that is likely to be utilized by the application subsequent to the activating the mode in which the wireless communications by the hardware processor via the communication network are disabled and the user interface continues to be active and usable by the user.

3. The electronic device of claim 1, wherein the hardware processor is configured to determine the prefetch data to request from a third user input of the plurality of user inputs that is not processed by the application.

4. The electronic device of claim 1, wherein the second user input comprises a request to activate a feature of the application, and wherein the hardware processor is configured to, subsequent to the activating the mode in which the wireless communications by the hardware processor via the communication network are disabled and the user interface continues to be active and usable by the user, process the prefetch data with the application for a first time responsive to processing the second user input with the application.

5. The electronic device of claim 1, wherein the hardware processor is configured to:
   determine a duration that the mode in which the wireless communications by the hardware processor via the communication network are disabled and the user interface continues to be active and usable by the user is expected to be activated, and
   determine the prefetch data to request according to the duration.

6. The electronic device of claim 1, wherein the communication network comprises a cellular network.

7. The electronic device of claim 6, wherein the mode is an airplane mode in which all wireless communications by the hardware processor are disabled.

8. The electronic device of claim 1, wherein the mode is an airplane mode in which all wireless communications by the hardware processor are disabled.

9. A method for intelligently prefetching data via a computer network, the method comprising:
   receiving, by a user interface of a mobile device, a plurality of user inputs from a user;
   storing an application to a memory device of the mobile device; and
   under control of a hardware processor:
      determining from a first user input of the plurality of user inputs that the hardware processor is expected to be unable to communicate via a communication network, the first user input indicating a request to activate a mode in which wireless communications by the hardware processor via the communication network are disabled and the user interface continues to be active and usable by the user;
      in response to the first user input:
         delaying activation of the mode in which the wireless communications by the hardware processor via the communication network are disabled and the user interface continues to be active and usable by the user,
         determining prefetch data to request prior to the activation of the mode in which the wireless communications by the hardware processor via the communication network are disabled and the user interface continues to be active and usable by the user,
         requesting the prefetch data from one of a plurality of systems via the communication network, and
         receiving the prefetch data via the communication network and storing the prefetch data to the memory device,
      responsive to said receiving the prefetch data, activating the mode in which the wireless communications by the hardware processor via the communication network are disabled and the user interface continues to be active and usable by the user; and
      subsequent to the activation of the mode in which the wireless communications by the hardware processor via the communication network are disabled and the user interface continues to be active and usable by the user, processing the prefetch data with the application for a first time responsive to processing a second user input of the plurality of user inputs with the application.

10. The method of claim 9, wherein said determining the prefetch data to request comprises determining application data that is likely to be utilized by the application subsequent to the activation of the mode in which the wireless communications by the hardware processor via the communication network are disabled and the user interface continues to be active and usable by the user.

11. The method of claim 9, wherein the second user input comprises a request to activate a feature of the application.

12. The method of claim 9, further comprising determining for how long the hardware processor is expected to be unable to communicate via the communication network, wherein said determining the prefetch data to request is based at least on for how long the hardware processor is expected to be unable to communicate via the communication network.

13. The method of claim 9, wherein the communication network comprises a cellular network.

14. The method of claim 9, wherein the mode is an airplane mode in which all wireless communications by the hardware processor are disabled.

15. Non-transitory physical computer storage comprising computer-executable instructions stored thereon that, when executed by one or more processors of a mobile device, are configured to implement a process comprising:
  determining from a first user input that the one or more processors are expected to be unable to communicate via a communication network, the first user input indicating a request to activate a mode in which wireless communications by the one or more processors via a communication network are disabled and a user interface continues to be active and usable by a user;
  in response to the first user input:
    delaying activation of the mode in which the wireless communications by the one or more processors via the communication network are disabled and the user interface continues to be active and usable by the user;
    determining prefetch data to request prior to the activation of the mode in which the wireless communications by the one or more processors via the communication network are disabled and the user interface continues to be active and usable by the user;
    requesting the prefetch data from one of a plurality of systems via the communication network; and
    receiving the prefetch data via the communication network and storing the prefetch data to a memory device;
  responsive to said receiving the prefetch data, activating the mode in which the wireless communications by the one or more processors via the communication network are disabled and the user interface continues to be active and usable by the user; and
  subsequent to the activation of the mode in which the wireless communications by the one or more processors via the communication network are disabled and the user interface continues to be active and usable by the user, processing the prefetch data responsive to processing a second user input.

16. The non-transitory physical computer storage of claim 15, wherein said determining the prefetch data to request comprises determining application data that is likely to be utilized by an application subsequent to the activation of the mode in which the wireless communications by the one or more processors via the communication network are disabled and the user interface continues to be active and usable by the user.

17. The non-transitory physical computer storage of claim 15, wherein the second user input comprises a request to activate a feature of an application.

18. The non-transitory physical computer storage of claim 15, wherein the communication network comprises a cellular network.

19. The non-transitory physical computer storage of claim 15, wherein the mode is an airplane mode in which all wireless communications by the one or more processors are disabled.

* * * * *